UNITED STATES PATENT OFFICE.

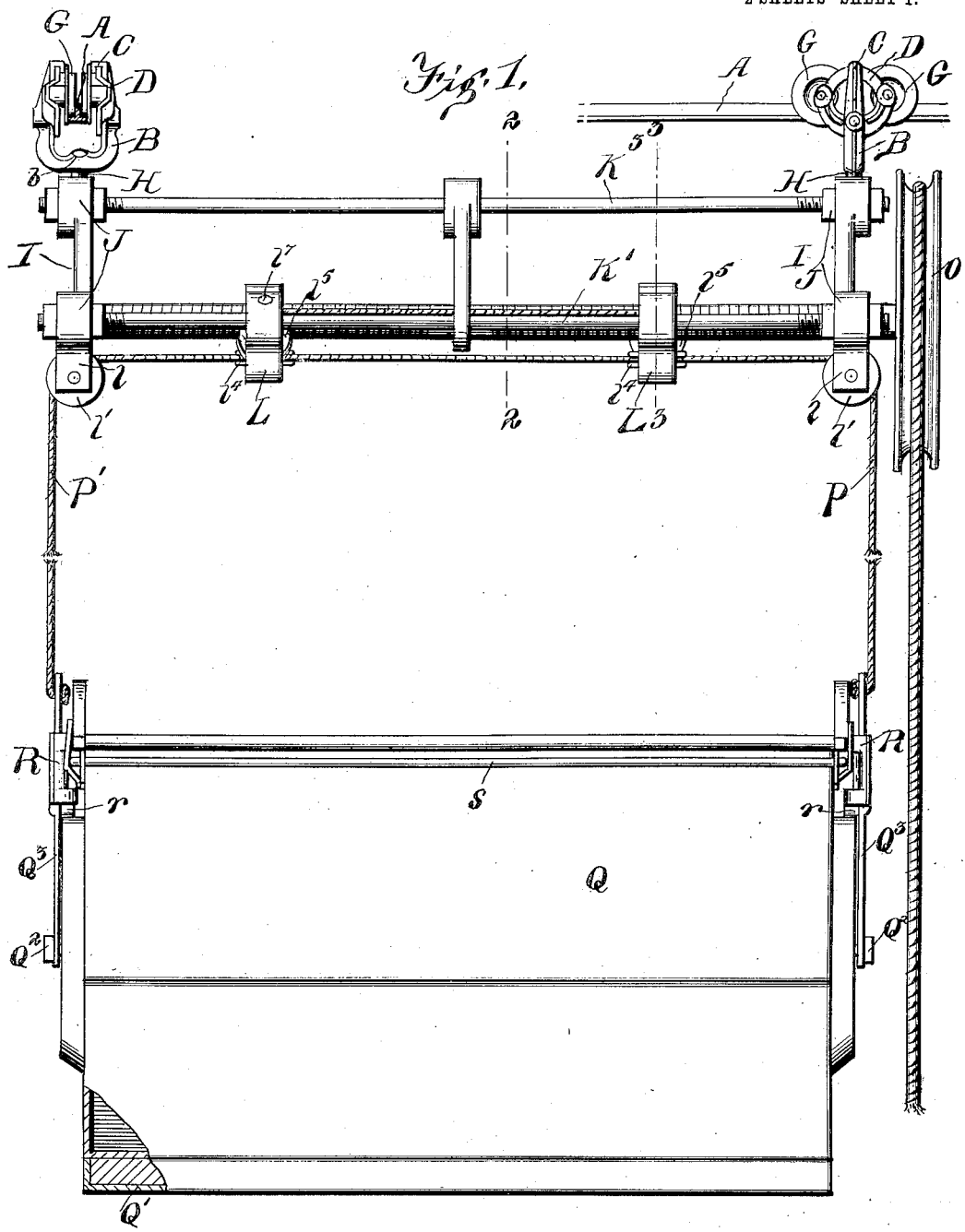

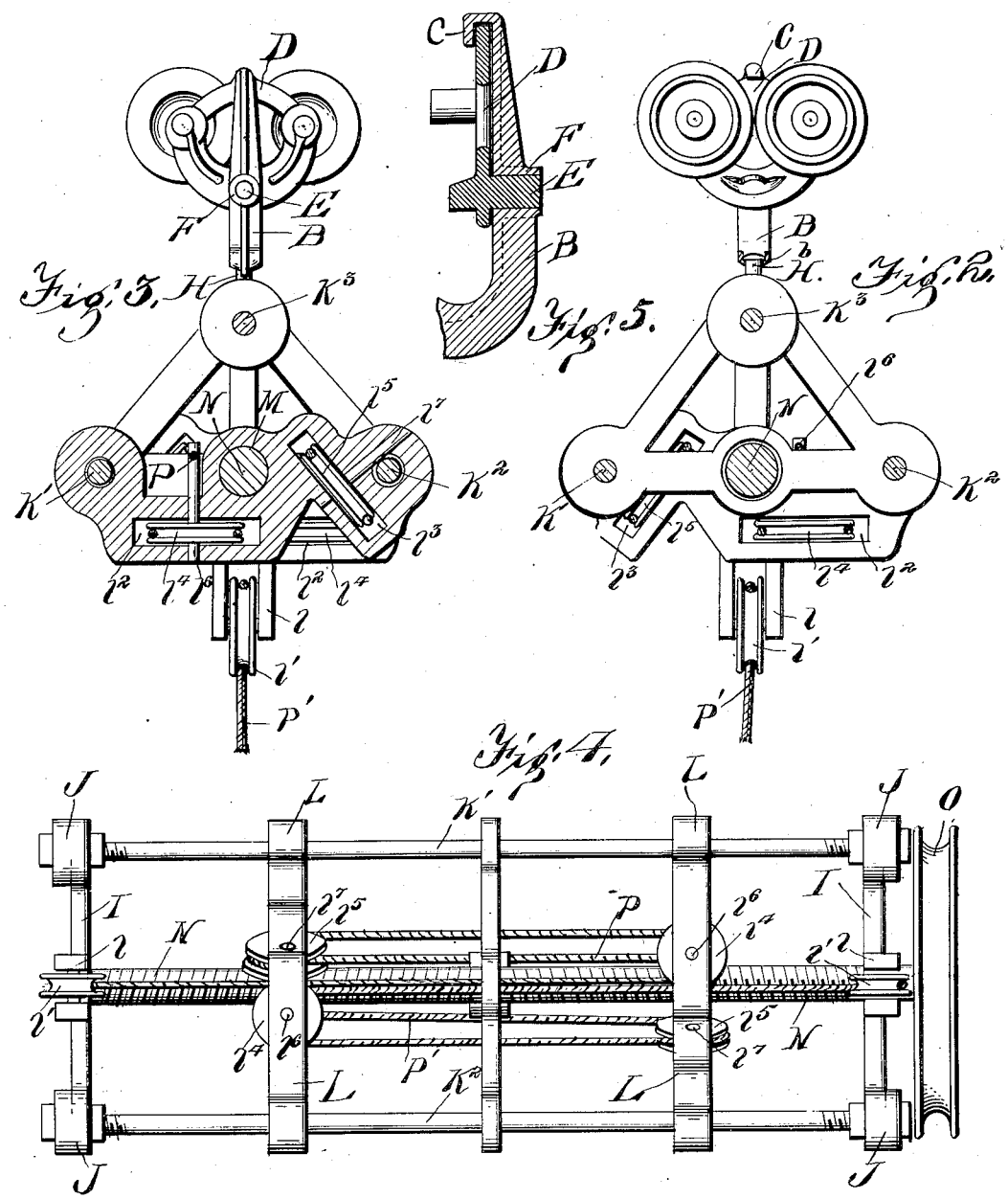

ARTHUR D. LONG AND GEORGE DIETZ, OF FAIRFIELD, IOWA, ASSIGNORS, BY DIRECT AND MESNE ASSIGNMENTS, TO LOUDEN MACHINERY COMPANY, OF FAIRFIELD, IOWA, A CORPORATION OF IOWA.

CONVEYER.

No. 897,380.  Specification of Letters Patent.  Patented Sept. 1, 1908.

Application filed June 19, 1905. Serial No. 266,003.

*To all whom it may concern:*

Be it known that we, ARTHUR D. LONG and GEORGE DIETZ, citizens of the United States of America, residing at Fairfield, in the county of Jefferson and State of Iowa, have invented certain new and useful Improvements in Conveyers, of which the following is a specification.

This invention relates to overhead carriers and particularly to a device designed for use as a feed and litter carrier.

The objects of this invention are; first, to produce a suitable truck and to provide means for connecting the truck to a hanger whereby the said hanger is permitted to oscillate at a point below the truck wheels, and furthermore to provide means for limiting the oscillatory motion to the members; second, to provide novel means for attaching an elevating device to the truck so that said elevating device has a limited movement independent of the truck, thereby obviating unusual strain and wear incident to the use of the device; third, to provide novel means for elevating a load and for causing the said load to be retained at different heights through a mechanism which obviates the use of manually operated catches or holding means.

With the foregoing and other objects in view, the invention consists in the details of construction, and in the arrangement and combination of parts to be hereinafter more fully set forth and claimed.

In describing the invention in detail reference will be had to the accompanying drawings, forming part of this specification wherein like characters denote corresponding parts in the several views, in which—

Figure 1, is a view in elevation showing the bucket, a frame for the hoisting mechanism, trucks for supporting the frame; the truck at the left hand side of the sheet being turned out of its operative position and a track being shown in section for the purpose of illustrating a front view of the truck when on a track; it being understood that the truck at the right hand side is in its operative position and that both trucks are supposed to run on a single track. Fig. 2, is a sectional view on the line 2—2 of Fig. 1, the truck being turned to show the inner side in elevation. Fig. 3, is a sectional view on the line 3—3 of Fig. 1; the truck being turned to show the inner side in elevation. Fig. 4, is a bottom plan view of the frame. Fig. 5, is a sectional view of one side of the hanger with the supporting plate in place.

In these drawings A, denotes the track which is suitably supported, though the support is not shown, and B, is an approximately U-shaped hanger, one of which is provided for each end of the carrier frame. The upper ends of the hanger have lugs C, which form guides, between which, and the sides of the hanger, plates D, extend, the said plates each having a stud E, fitted in an apertured boss F, of the hanger B, so that said hanger oscillates thereon.

The track wheels G, are preferably of chilled metal, run on tempered steel bushings which are shrunk on the axles of malleable iron to support the plates D, though of course, it will be understood that the material entering into the construction is an immaterial detail.

Each hanger B, has an aperture $b$, through which a stud H, is passed for connecting the said hanger to the frame of the elevating mechanism, (to be hereinafter described) and it will be noted that when the truck is stationary, and force is applied to cause the truck to travel, the hangers will oscillate with the result stated.

The hoisting mechanism comprises a frame having two heads I, which are approximately triangular, provided with apertured bosses J, in which connecting rods are secured. The frame is provided with a central angular plate of the same general shape as the heads and it has a series of apertures to receive the rods $K^1$—$K^2$—$K^3$, which are secured to the heads in any suitable manner.

The rods $K^1$, $K^2$, form guides and supports for the sliding yokes L, L, which yokes have threaded apertures M, to receive the screw N, it being understood that the said screw is oppositely threaded from the center toward its ends, in order that the yokes may be moved in opposite directions according to the direction of rotation of the screw N. The screw has a bearing in the heads J, of the frame, and one end of said screw projects beyond one of the heads and has secured thereto the power wheel O, which power wheel may be in the shape of a grooved pulley, a sprocket wheel or other means by which a flexible connection may be utilized to turn it, though if desired, other means for rotating the screw may be provided. Each head is provided with a depending hanger $l$, to support the pulley $l'$ and each yoke is provided with a transverse slot $l^2$, and an obliquely disposed slot $l^3$, for the reception of the pulleys $l^4$, and $l^5$, respectively, it being understood that these pulleys are mounted on suitable shafts $l^6$, and $l^7$, respectively. While I have stated the position of the slots with relation to the yoke, it is an immaterial detail, as they may be changed to suit particular requirements.

In order to effect the elevation and support of a load by the mechanism heretofore described, it is essential that cables P, P', be utilized (and by the term "cable" I mean any flexible connection capable of traveling over the pulleys and to that end, a rope, wire cable, chain or other flexible device may be used) each having one end attached in any suitable manner to one of the yokes and then extended over one of the pulleys $l^5$, and back over one of the pulleys $l^4$, after which it is carried over the pulley $l'$, where the opposite end is attached to the receptacle to be elevated.

In operation, the rotation of the wheel O, in either direction will result in turning the screw N, and as the yokes are threaded on the screw end, it will follow that the said yokes will be carried to or away from the center according to the direction of rotation of the said screw. As each yoke has one end of a cable P, attached to it, and as the cable which is attached to one yoke has its opposite end extending over a pulley of the head of the frame, the movement of the said yokes tends to draw the ends of the cables toward the frame or permit the descent of the ends of the cable according to the direction of rotation of the screw, and as the said cables support the bucket or box Q, it follows that the said bucket or box is elevated or lowered with the manipulation of the mechanism just described.

In the construction of the conveyer bucket or box, which for the convenience of description will be hereafter termed a bucket in order that the term may agree with the classification in the Patent Office, a single blank or sheet of metal is employed to produce the bottom, sides and ends, thereby producing a bucket of this character formed of a single piece of metal which will tend to increase the durability and efficiency, especially so as rivets are dispensed with, to a great extent, in the construction.

Having fully described our invention what we claim as new and desire to secure by Letters Patent, is—

1. In combination, a frame comprising heads connected by rods, pulleys carried by the heads, means attached to the heads for supporting the frame, a screw rotatably mounted in the heads, yokes movable on the rods and engaged by the screw, pulleys carried by the yokes, a bucket, connections between the bucket and the yokes, said connections passing over the pulleys of the heads and yokes.

2. In combination, a frame comprising heads connected by rods, means attached to the heads for supporting the frame, a screw rotatably mounted in the heads, said screw having its end portions oppositely threaded, yokes mounted on the rods of the frame and engaged by the screw, a bucket, connections between the bucket and the yokes.

3. In combination, angular heads, rods connecting the heads near their apices, a screw rotatably mounted in the heads, yokes movable on the rods and engaged by the screw, pulleys carried by the yokes, pulleys carried by the heads, a bucket, and connections between the bucket and the yokes, said connections passing over the pulleys of the heads and yokes.

4. In a conveyer, a frame comprising heads and parallel rods, yokes slidable on the rods, pulleys mounted to rotate in the yokes approximately alining longitudinally of the frame, flexible connections run over the longitudinally alining pulleys, the said flexible connections leading from the frame at opposite ends, a receptacle suspended from the flexible connection and means for moving the yokes longitudinally of the frame.

5. In a conveyer, a frame consisting of heads, rods connecting the heads, yokes slidable on the rods, pulleys carried by the yokes and heads, flexible connections run over the pulleys and extending over the pulleys on the heads, a receptacle attached to the ends of the flexible connections, means whereby the movement of the yokes operates the flexible connections over the pulleys on the heads and means for moving the yokes.

In testimony whereof we affix our signatures in the presence of two witnesses this 14 day of June, 1905.

ARTHUR D. LONG.
    GEORGE DIETZ.

Witnesses:
 H. G. KING,
 G. H. BABCOCK.